United States Patent [19]

Ferrell

[11] Patent Number: 4,533,102
[45] Date of Patent: Aug. 6, 1985

[54] GROUNDING WIRE CLAMPING DEVICE

[76] Inventor: David R. Ferrell, 4125 Townhouse Rd., Apt. K, Richmond, Va. 23228

[21] Appl. No.: 523,866

[22] Filed: Aug. 17, 1983

[51] Int. Cl.$^3$ ................................................ F16L 3/08
[52] U.S. Cl. .................................. 248/74.1; 248/316.1
[58] Field of Search ..................... 248/74.1, 74.2, 74.5, 248/316.1, 316.2, 316.7; 24/542, 458, 339

[56] References Cited

U.S. PATENT DOCUMENTS

| | | | |
|---|---|---|---|
| 682,847 | 9/1901 | Forsyth | 248/74.1 |
| 893,438 | 7/1908 | Caesar | 248/74.1 |
| 1,704,075 | 3/1929 | Brown | 24/458 |
| 2,527,442 | 10/1950 | Odegaard . | |
| 2,688,655 | 9/1954 | Gross . | |
| 3,100,324 | 8/1963 | Tutino et al. | 24/542 |
| 3,216,684 | 11/1965 | Larson . | |
| 3,341,651 | 9/1967 | Odegaard | 248/74.5 |
| 3,491,972 | 1/1970 | Townshend . | |
| 3,689,686 | 9/1972 | Wilson . | |
| 3,848,080 | 11/1974 | Schmidt . | |
| 3,906,592 | 9/1975 | Sakasegawa et al. . | |
| 4,029,276 | 6/1977 | Zielie | 248/74.1 |

Primary Examiner—Ramon S. Britts
Assistant Examiner—Ramon O. Ramirez
Attorney, Agent, or Firm—Cushman, Darby & Cushman

[57] ABSTRACT

A wire clamping and retaining device comprises first and second integrally interconnected leg members which are separated by a predetermined separation distance while in a normal position. A biasing force is established, preferably by the inherent properties of a rigid material capable of resilient deformation, so as to bias the leg members into the normal position. A cavity is defined in the device and intermediate the cavity and the terminal ends thereof, an inclined surface is provided so that when the device is laterally moved relative to a wire, outward displacement of the leg members will be effected so as to gain access to the cavity. Once the wire is accepted in the cavity, the biasing force will once again return the leg members to their normal position and thus frictionally engaged the wire contained in the cavity to prevent axial slippage relative thereto. Thereafter, a nail or other suitable means is utilized to secure the device to a substrate.

9 Claims, 5 Drawing Figures

GROUNDING WIRE CLAMPING DEVICE

BACKGROUND AND SUMMARY OF THE PRESENT INVENTION

1. Introduction

The present invention generally relates to a grounding wire clamping device utilized to secure or clamp a wire to a rigid substrate such as, for example, a wooden utility pole, building or the like. More specifically, the present invention relates to a device which aids the person handling the device (hereinafter "lineman") so as to facilitate easy placement and installation thereof.

2. The Prior Art

Various attempts have been made in the art to provide clamping means which secure a wire to a rigid substrate. Indeed, devices of the wire clamping genre are not new to the art, in and of themselves, as exemplified by the following prior-issued U.S. patents. For example, U.S. Pat. No. 3,341,651 to Odegaard generally discloses a clip for securing wire, cable or the like to a substrate. In accordance with Odegaard, a spike 40 having a bar 10 attached thereto is first driven into a substrate (e.g. concrete wall 52) and the bar 10 is subsequently bent into a U-shape so as to register the head 45 with opening 30a. Upon tapping of end 20 with a hammer or the like (as shown in Odegaard's FIG. 4) the tapered head 45 will be forced through opening 30a in the bottom of clamp 34 and into opening 30 thereby retaining bar 10 in its U-shape and thus securing cable 54 to wall 52. It is significant to note in Odegaard's FIG. 4 that it is necessary to manually retain bar 10 in its U-shaped position while simultaneously tapping end 20 so as to force spike head 45 through opening 30a.

In accordance with the present invention, however, once the wire is securely retained in the clamping device, the biasing nature thereof prevents axial slippage of the device relative to the wire so as to permit a lineman to have free use of his hands. This important advantage of the present invention is further underscored when consideration is given to the fact that a lineman normally wears thick rubber insulating gloves (typically about ⅛ inch thick) over which a protective outer leather glove is placed. Accordingly, a lineman's hands are typically encumbered by the use of such protective clothing and thus, the requirement of Odegaard's structure that the bar 10 be manually held in place becomes a readily apparent disadvantage to its use.

U.S. Pat. No. 3,906,592 to Sakasegawa et al provides a rather complicated interlocking tab/latch assembly 46, 45, respectively. However, once again, such an intricate and complicated interlocking tab/latch assembly in accordance with Sakasegawa et al not only increases the cost of manufacture but also does not lend itself to ready manipulation by a lineman who is wearing the relatively thick gloves briefly mentioned above.

Accordingly, the devices of both Odegaard and Sakasegawa et al would tend to encourage a lineman to remove his glove so that the devices thereof can be readily manipulated. This, of course, is not a desirable occurrence.

The reader may also wish to refer to the following U.S. patents in order to more fully appreciate the novel characteristics of the present invention: U.S. Pat. Nos. 3,216,684 to Larson; 2,688,655 to Gross; 3,689,686 to Wilson; 3,848,080 to Schmidt; 2,527,442 to Odegaard; and 3,491,972 to Townshend.

3. Summary of the Present Invention

As briefly alluded to above, the present invention provides a device which is easily manipulable and, moreover, provides structures which permit the clamp to function in a manner which is believed to be heretofore unknown in this art.

One of the preferred characteristics of the present invention is that it can be constructed of a rigid electrically insulating material, such as plastic so as to provide sufficient insulative properties thereto. Typically, the wire clamp of the present invention will be utilized to clamp grounding wires (e.g. bare copper wires) to a substrate. The present practice is to utilize large staples which may lead to radio and/or televison interference. Additionally, the staples tend to become loose by the staple "backing out" of the substrate or utility pole or due to the actual shrinkage of the utility pole.

These problems are alleviated according to the present invention since the plastic material is completely insulative and the securing device such as nail, spike or the like is separated from the bare copper grounding wire. Accordingly, the use of a conventional nail or spike (see Odegaard '651) will securely retain the device of the present invention and thus the bare copper grounding wire against the substrate but yet prevent any electrical interference therewith.

In accordance with the present invention, a generally U-shaped member having substantially opposing end portions is provided, the ends being initially disposed in a normal "open" position thereby defining a predetermined separation distance therebetween. A cavity to accept the wire is also defined by the U-shaped member and intermediate the cavity and the opposing ends, there is preferably provided an inclined surface, the purpose of which will become more apparent from the discussion which follows. According to the present invention, means are provided by which a person installing the device can easily and effectively manipulate the device so as to provide clamping action to the wire.

An important feature of the present invention is the provision of an upwardly inclined surface which acts as a cam of sorts so that as the device is laterally moved with respect to the wire, wedging engagement of the wire will be effected between the inclined surface and one of the legs of the generally U-shaped member. Upon continued lateral movement of the device in accordance with the present invention with respect to the wire, the wire will be relatively upwardly displaced by virtue of the incline of the surface and responsive outward displacement of the opposing ends will be effected. Continued lateral movement of the device with respect to the wire will therefore permit access to the cavity so that the wire can be accepted therein. Once the wire is accepted in the cavity, a biasing force preferably provided by the inherent properties of the material of construction of the device (e.g. a plastic material which is rigid but yet is capable of resilient deformation under sufficient force), biases the opposing ends of the generally U-shaped member into their initial separated or "open" position to frictionally engage the wire in the cavity. Such frictional engagement of the device with respect to the wire thereby prevents axial slippage of the device relative to the axis of elongation of the wire which is of great assistance to the lineman.

These and other advantages of the present invention will become more clear to the reader after careful consideration is given to the detailed description thereof which follows.

BRIEF DESCRIPTION OF THE ACCOMPANYING DRAWINGS

Reference will be hereinafter made to the accompanying drawings wherein like reference numerals throughout the various figures denote like structural elements and wherein.

DETAILED DESCRIPTION OF THE PREFERRED EXEMPLARY EMBODIMENT

Figure 1:
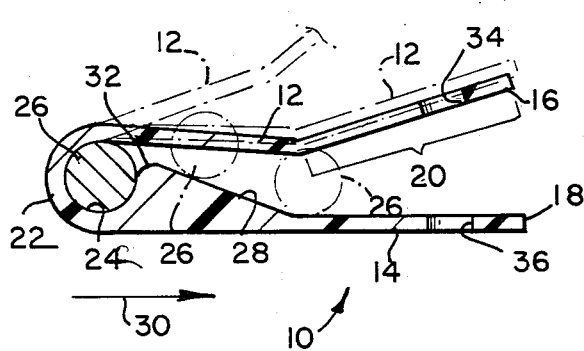
FIG. 1 is a cross-sectional elevational view of the clamping device in accordance with the present invention taken along line 1—1 in FIG. 2.
Figure 2:
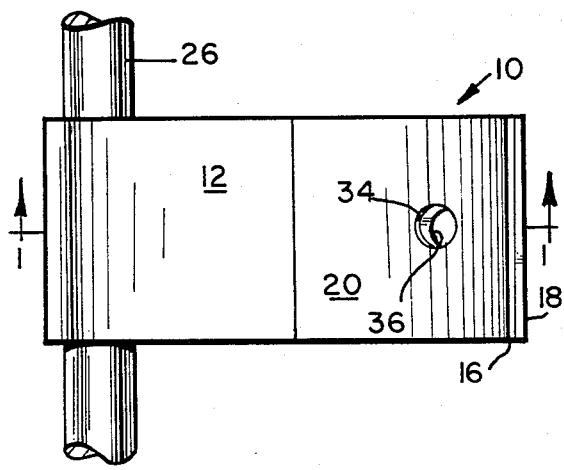
FIG. 2 is a top plan view of the clamping device in accordance with the present invention.

The reader's attention is directed to the accompanying drawings wherein a preferred exemplary embodiment of the present invention is depicted. With particular reference to FIGS. 1 and 2, the device 10 in accordance with the present invention is shown as generally including a U-shaped body member having opposing leg portions 12, 14 having terminal ends 16, 18, respectively, which are separated by a predetermined dimension. What will hereinafter be referred to as the "normal" or "open" position of device 10 is depicted in FIG. 1 in solid line. A portion 20 of leg member 12 is preferably angularly disposed relative to leg member 14, the purpose of which will become more apparent from the discussion below.

Leg members 12, 14 are connected by integral connecting member 22 which defines a substantially cylindrical cavity 24 for accepting and retaining wire 26 therein. A surface 28 is disposed intermediate end 18 and cavity 24 and is upwardly inclined in the direction of cavity 24.

The operation of the device in accordance with the present invention to secure a wire 26 in cavity 24 is as follows. A lineman will first place the device 10 relative to wire 26 so that wire 26 is disposed in the spaced-apart area between ends 16 and 18. Thereafter, the lineman will effect movement of device 10 (arrow 30 in FIG. 1) laterally with respect to wire 26. Such lateral movement will cause the inclined surface 28 and wire 26 to relatively approach one another until wire 26 engages surface 28. Thereafter, continued lateral movement (arrow 30) of device 10 with respect to wire 26 will responsively effect upward displacement of wire 26. Thus, wire 26 will become wedgingly engaged between inclined surface 28 and leg member 12 such that continued lateral movement of device 10 with respect to wire 26 will effect responsive outward displacement of leg member 12 relative to leg member 14 as noted in phantom lines in FIG. 1. When wire 26 reaches the end 32 of ramp 28 a sufficient gap will be present between end 32 and leg member 12 so as to accommodate the diameter of wire 26 and to permit access to cavity 24. In such a manner, wire 26 will eventually be seated and retained in cavity 24 once the wire 26 is moved beyond end 32.

Once wire 26 is accepted in cavity 24, the biasing nature of the present invention causes a bias force to be exerted on leg member 12 so as to return it to its "normal" or "open" position (as noted in solid line in FIG. 1). This bias force will therefore once again reduce the dimension between end 32 of surface 28 and leg member 12 and will thus exert a clamping force against wire 26 so as to frictionally engage wire 26 in cavity 24. Such frictional engagement prevents axial slippage of device 10 relative to wire 26 so that once wire 26 is contained in cavity 24, the lineman is permitted unencumbered use of his hands. That is, the lineman may then release device 10 so as to accomplish other tasks without fear that device 10 will slip from his immediate vicinity.

Figure 3:
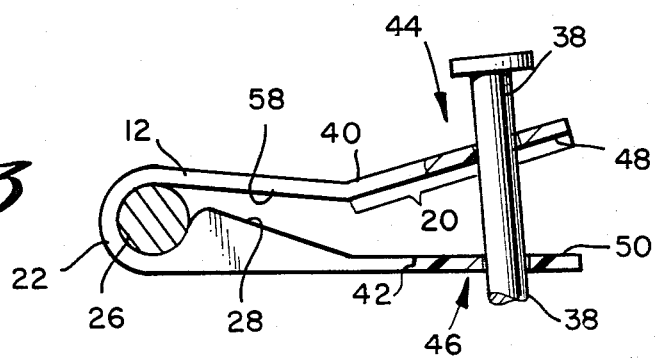
FIGS. 3-5 are side elevational views (partly in section) of the device in accordance with the present showing the progressive fastening thereof to a substrate.
Figure 4:
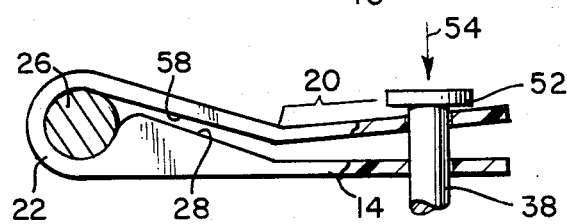
Figure 5:
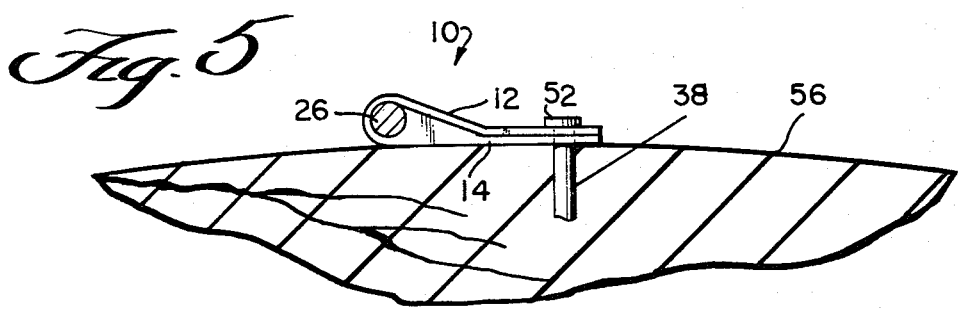

With wire 26 contained in cavity 24, the lineman will then secure device 10 to a substrate, such as a wooden utility pole, building structure or the like and for the following discussion, the reader's attention is specifically directed to accompanying FIGS. 3-5. To accomplish this function, apertures 34, 36 are provided so as to accommodate a suitable securing means such as nail, spike or the like. As used herein and in the accompanying claims, the term "nail" shall be meant to include any elongated structure which is intended to secure objects to a substrate and, thus, includes all common nails, tacks, concrete spikes (see Odegaard '651), or the like.

As briefly noted above, a lineman typically wears rather thick protective gloves and thus, means are needed to retain a nail in apertures 34, 36. Such means are provided by the angular orientation of portion 20 with respect to leg member 14. Thus, when the device 10 of the present invention is in its "normal" or "open" position, the effective diameters of apertures 34, 36 are reduced relative to one another as viewed in plan (see, e.g. FIG. 2). This reduction in effective diameter of apertures 34, 36 will effect frictional engagement of device 10 with nail 38 so as to prevent slippage thereof prior to its being driven into the desired substrate.

In order to establish such frictional engagement with nail 38, the lineman will grasp exterior surfaces 40, 42 of portion 20 and leg member 14, respectively, and will apply a pinching force thereto (arrows 44, 46 in FIG. 3) so that the interior surfaces 48, 50 of portion 20 and leg member 14, respectively, achieve a substantial contiguous relationship relative to one another. Such contiguous adjacent relationship of surfaces 48, 50 will effect general alignment of apertures 34, 36 so as to permit nail 38 to be advanced therethrough.

Once nail 38 is disposed in apertures 34, 36 due to the surfaces 48 and 50 being in a general contiguous relationship, the lineman will then release the pinching force being applied to portion 20 and leg member 14 so that the biasing force of device 10 will once again urge ends 16 and 18 outwardly with respect to one another (e.g. tending to reestablish the "normal" or "open" position). However, once this pinching force is released from portion 20 and leg member 14, the effective combined relative diameter of apertures 34, 36 will be gradually reduced until the effective diameter thereof is substantially equal to the diameter of nail 38. At this point, the biasing force, which still tends to separate ends 16, 18 (e.g. in a direction opposite arrows 44, 46 in FIG. 3), frictionally engages nail 38 to prevent slippage thereof with respect to apertures 34, 36. Thereafter, force applied to the head 52 of nail 38 in a direction generally indicated by arrow 54 in FIG. 4 will cause nail 38 to be driven into the desired substrate (for example, wooden utility pole 56 as shown in FIG. 5). Thus, wire 26 will be securely retained in place and yet device 10 will permit easy manipulation thereof during installation. It should be noted that surface 58 of leg member 12 and surface 48 of portion 20 will mate in an adjacent contiguous manner with inclined surface 28 and interior surface 50 of leg member 14 so as to provide a neat appearance to the finished job.

While reference has been herein made to a rigid plastic material as the preferred material of construction for device 10, those in the art will appreciate that there may be certain applications wherein a metallic material, such as aluminum, or the like could also be advantageously utilized especially where the wire sought to be retained has an insulative covering thereover. Additionally, while surface 28 has been shown in the accompanying drawings and described above as being a substantially planar surface, other surfaces could also be advantageously utilized. Thus, it is entirely conceivable that surface 28 could take the form of a gradual concave or convex surface to achieve the same functions described above.

Accordingly, those in this art may appreciate that certain modifications may be made to the present invention, which modification shall be accorded the broadest scope of the appended claims so as to encompass all equivalent devices, structures and/or methods.

What is claimed is:

1. A wire clamping and retaining device comprising: first and second leg members;
    connecting means connecting said first and second leg members to define a cavity for accepting a wire therein and to establish a normal position of said first and second leg members wherein a predetermined separation distance is defined therebetween and wherein said first and second leg members are angularly oriented relative to one another, said connecting means including biasing means for establishing a bias force to bias said first and second leg members into said normal position and to exert a clamping force against the wire in said cavity to prevent the device from slipping axially relative to the wire;
    means associated with said first leg member defining a surface upwardly inclined in the direction of said connecting means, said inclined surface defining means for (a) establishing with a portion of said second leg member a wedge-shaped entranceway to said cavity through which said wire passes as said device is laterally moved relative to said wire, and (b) upwardly displacing the wire as the wire moves along said surface when said device is moved laterally relative to the wire to thereby cause said wire to assume a wedged relationship between said surface and said portion of said second leg member, wherein continued lateral movement of said device relative to said wire responsively effects relative outward displacement of said first and second leg members by virtue of the wedged relationship of the wire between said inclined surface and said portion of said second leg member to permit the wire to gain access to said cavity, said connecting means biasing said second leg member into said normal position upon acceptance of the wire in said cavity to frictionally engage the wire to substantially prevent axial slippage of the device relative thereto; and
    means associated with said first and second leg members for defining paired nail-accepting apertures, said biasing means by virtue of biasing said first and second leg members into said angularly oriented normal position angularly offsetting one aperture relative to the other aperture to thus frictionally hold a nail spanning said first and second leg members and disposed in said paired apertures.

2. A device as in claim 1 wherein said first leg member is substantially planar and wherein said second leg member includes a substantially planar portion angularly oriented with respect to said first leg member.

3. A device as in claim 1 wherein said inclined surface is substantially planar.

4. A device as in claim 1 wherein said biasing means is provided by the inherent properties of a substantially rigid material capable of resilient deformation under sufficient force, at least said connecting means consisting essentially of said material.

5. A device as in claim 6 wherein said first and second leg members consist essentially of said material.

6. A wire clamping and retaining device comprising a generally U-shaped member having paired opposing leg members and including;
    means defining a cavity for accepting and retaining a wire therein;
    means for biasing said paired leg members into a normal position wherein said paired leg portions are separated by a predetermined separation distance in the area of the terminal ends thereof and angularly converge from said terminal ends towards said cavity-defining means, said biasing means permitting said opposing leg members to resiliently assume a contiguous position relative to one another upon application of a closure force opposite to said biasing force;
    means, associated with one of said leg members, for defining a surface upwardly inclined in the direction of said cavity and to establish with a portion the other of said leg members a wedge-shaped entranceway to said cavity, said surface-defining means for upwardly displacing said wire as said device is moved laterally with respect to said wire to cause said wire to assume a wedged relationship with said portion of said other leg member to responsively effect outward displacement of said paired leg members relative to one another in response to continued lateral movement of said device and thus said surface relative to said wire by virtue of the wire being wedgingly engaged between the surface and said portion of said other leg member to permit said wire to be accepted into said cavity, said biasing means biasing said paired leg members into said normal position when the wire is accepted in said cavity to clamp and retain the wire therein to prevent axial slippage of said device relative to said wire, and wherein
    said opposing leg members respectively include means defining first and second apertures for accepting a securing element therein, said first and second apertures being aligned when said leg members assume said contiguous position and being angularly offset relative to one another when said leg members are in said normal position, said aperture-defining means for frictionally holding a securing element spanning said first and second apertures when said leg members are in said normal position.

7. A device as in claim 6 wherein the inclined surface is substantially planar.

8. A device as in claim 6 wherein said biasing means is provided by the inherent properties of a substantially rigid material capable of resilient deformation under sufficient force, said U-shaped member consisting essentially of said material.

9. A method of clamping and retaining a wire utilizing a device of the type having first and second leg members together defining a pair of nail-accepting apertures and connected to one another at one of the ends thereof so as to be separated by a predetermined dimension at the other of the ends thereof while in a normal position, means biasing the first and second leg member into said normal position, means defining a cavity at said one of the ends thereof, and means associated with said first leg member for defining a surface inclined in the direction of said cavity, said method comprising the steps of:

(a) positioning the device relative to the wire so that the wire is initially disposed between said first and second separated leg members proximally to said other of the ends thereof;

(b) moving the device laterally with respect to the wire to cause the wire to engage the inclined surface and to progressively upwardly displace said second leg member in response to continued lateral movement of the device to permit the wire to gain access to said cavity;

(c) stopping the lateral movement of step (b) when said wire is accepted in said cavity to allow said leg member to be biased into said normal position to frictionally engage and retain the wire in said cavity; and (d) securing the device having the wire retained therein to a substrate according to the steps of:
  (i) applying a force to said first and second leg members to bring said first and second leg members into a substantially contiguous relationship so as to substantially align said pair of apertures;
  (ii) placing a nail in said aligned pair of apertures;
  (iii) releasing the force applied according to step (i) so that the biasing force tends to separate said first and second leg members to frictionally engage the nail in said pair of apertures; and
  (iv) forcing said nail into the substrate.

* * * * *